United States Patent [19]

Joos et al.

[11] Patent Number: 5,736,711
[45] Date of Patent: Apr. 7, 1998

[54] UNDERWATER ARC-WELDING APPARATUS

[75] Inventors: Thomas C. Joos, Ontario; Taner Bayrak, Westminster, both of Calif.

[73] Assignee: Broco, Inc., Rancho Cucamonga, Calif.

[21] Appl. No.: 587,242

[22] Filed: Jan. 12, 1996

[51] Int. Cl.⁶ .................................................. B23K 9/10
[52] U.S. Cl. ........................ 219/132; 219/72; 310/87
[58] Field of Search ........................ 219/72, 132, 136; 310/87

[56] References Cited

U.S. PATENT DOCUMENTS

| Re. 28,357 | 3/1975 | Berghof . | |
|---|---|---|---|
| 2,758,226 | 8/1956 | Fisher | 310/87 |
| 2,761,985 | 9/1956 | Schaefer | 310/87 |
| 2,944,297 | 7/1960 | Maynard | 310/87 |
| 3,581,042 | 5/1971 | Pilia | 219/61 |
| 3,671,707 | 6/1972 | Cunningham | 219/74 |
| 3,787,655 | 1/1974 | Anderson et al. | 219/72 |
| 3,794,804 | 2/1974 | Berghof | 219/137 |
| 3,876,852 | 4/1975 | Topham | 219/72 |
| 3,892,937 | 7/1975 | Paton et al. | 219/72 |
| 3,898,418 | 8/1975 | Hasui | 219/121 |
| 3,973,712 | 8/1976 | Armstrong et al. | 228/57 |
| 3,989,920 | 11/1976 | Masubuchi et al. | 219/98 |
| 4,029,930 | 6/1977 | Sagara et al. | 219/74 |
| 4,035,602 | 7/1977 | Berghof | 219/72 |
| 4,039,798 | 8/1977 | Lythall et al. | 219/72 |
| 4,139,758 | 2/1979 | Pinfold | 219/74 |
| 4,154,999 | 5/1979 | Pinfold et al. | 219/72 |
| 4,475,026 | 10/1984 | Schloerb et al. | 219/98 |
| 4,539,498 | 9/1985 | Wilkes | 310/87 |
| 4,654,500 | 3/1987 | Stiles et al. | 219/72 |
| 4,835,355 | 5/1989 | Niinivaara et al. | 219/72 |
| 4,894,512 | 1/1990 | Heusi et al. | 219/130.4 |

*Primary Examiner*—Clifford C. Shaw
*Attorney, Agent, or Firm*—James R. Brueggemann; Sheppard, Mullin, Richter & Hampton

[57] ABSTRACT

An improved underwater arc-welding apparatus that includes a handheld torch assembly connected to an housing that delivers electrical power, a pressurized shielding gas, and a consumable wire electrode to the site of the weldment. The housing is configured such that the diver/operator, himself, can control such welding parameters as the voltage level of the electrical power, the duration of the flow of the shielding gas, and the delivery rate of the electrode. In addition, the housing is configured to allow the entry of water into the space between its components, and these components, including an electric motor that advances the consumable wire electrode, are sealed individually from the water. Electrical connections between the components are effected using underwater cables and connectors. This configuration enables the apparatus to have a relatively non-bulky construction, which facilitates its convenient transport underwater by the diver/operator and further facilitates the servicing and/or replacement of components while the housing is submerged.

15 Claims, 3 Drawing Sheets

5,736,711

UNDERWATER ARC-WELDING APPARATUS

BACKGROUND OF THE INVENTION

This invention relates generally to arc-welding apparatus and, more particularly, to arc-welding apparatus configured to operate while submerged under water.

With the recent growth of the underwater industry, the need for effective underwater welding has grown, as well. In the past, welding apparatus suitable for underwater use have typically included a handheld welding gun, or torch, that delivers an electrical current and a consumable electrode to a workpiece to be welded and that sometimes further delivers a shielding gas coaxially around the electrode. The consumable electrode usually takes the form of a stick, which must be replaced periodically. Wire electrodes drawn from a spool have been proposed as alternatives to stick electrodes, but are not commonly in use. The shielding gas, which can include a suitable gas such as argon, nitrogen, or carbon dioxide, shields the weldment from the surrounding water, and constituents in the water, for sufficient time to allow the molten metal to cool and thereby to provide a satisfactory weld. Sometimes, the consumable electrode, itself, can incorporate a material that when heated generates the required shielding gas, thus obviating the need to deliver the shielding gas separately.

The welding apparatus described briefly above has proven to be effective in providing satisfactory welds in underwater environments. However, its use has not proven to be entirely satisfactory. This is because the diver/operator who manipulates the handheld torch generally does not have adequate control over the electromechanical parameters that affect the welding process. These parameters include, for example, the ON/OFF status of electrical power being delivered through the electrode to the workpiece, the delivery rate of the consumable wire electrode, if present, and the duration of the flow of the shielding gas, if present. Control of these parameters typically has been by an operator situated on a platform located above the water's surface. This separation of control is particularly disadvantageous, because high-quality weld deposits can best be ensured by providing the control of these parameters to the diver/operator who is present and observing the welding process.

Another deficiency of some prior underwater arc-welding apparatus is that the apparatus have included underwater housings that are watertight. This has required the housings to be unduly bulky, making them difficult for the diver/operator to transport and manipulate. This also has prevented the diver/operator from opening the housing while underwater, for replacement or servicing of components contained in it.

It should, therefore, be appreciated that there is a need for an underwater arc-welding apparatus that is configured to provide the diver/operator, himself, with greater control over welding parameters such as the application of welding power to the torch assembly and the delivery rate of a consumable wire electrode. Moreover, there is a need for such an apparatus that has a non-bulky construction and that facilitates servicing and/or replacement of components even when the apparatus is submerged. The present invention fulfills these needs.

SUMMARY OF THE INVENTION

The present invention is embodied in an underwater arc-welding apparatus that is configured to provide the diver/operator, himself, with greater control over welding parameters, such as the application of welding power and the delivery rate of a consumable wire electrode, and that is configured to allow the servicing and/or replacement of components even while the apparatus is submerged. The apparatus includes a handheld welding torch assembly connected to a housing that houses certain components that control and deliver electrical power and the consumable wire electrode. These components include a wire delivery device and a control circuit that controls the wire delivery rate. In accordance with the invention, the housing is configured to allow the entry of water into its interior space when the housing is submerged in water, and the control circuit and at least a portion of the wire delivery device are each sealed individually from water, e.g., by a suitable potting material. Electrical connections between these components are made using underwater cables and underwater connectors. This configuration allows the housing to be relatively lightweight and inexpensive and further allows the housing to be opened while underwater, for servicing and/or replacement of one or more of its components.

In a more detailed feature of the invention, a contactor and associated control circuit are housed in the housing, for providing the electric power to the torch assembly, and a solenoid assembly and associated control circuit also are housed in the housing, for providing a pressurized shielding gas to the torch assembly. These components are sealed individually from water, e.g., by a suitable potting material, when the housing is submerged. The control circuits for the wire delivery device, the contactor, and the gas solenoid, together, include a control panel that is configured to allow the diver/operator to control the delivery rate of the wire electrode, the voltage level of the electric power, and the duration of the flow of the pressurized shielding gas.

In another feature of the invention, the wire delivery device includes a rotatable spool that carries the wire electrode, a gear assembly that draws the wire electrode from the spool, and an electric motor that drives the gear assembly at a controllably variable speed. The electric motor is part of an assembly that is individually sealed; the rotatable spool and the gear assembly likewise can be sealed, but need not be.

The motor assembly includes a generally cylindrical motor housing with a motor shaft projecting from one end of the motor housing. It further includes a sleeve that encircles the motor housing and an end plate that is secured to one end of the sleeve and that has an aperture through which the motor shaft projects. In addition, a bushing is disposed in the end plate aperture, encircling the motor shaft, and a shaft seal (e.g., a Bal seal and an O-ring) is located between the bushing and the motor shaft and a seal (e.g., caulking) is located between the bushing and the end plate. Finally, a potting compound is disposed in any space between the motor housing and the sleeve and end plate. This effectively seals the motor from water while offering only negligible resistance to rotation of the motor shaft.

In another more detailed feature of the invention, the motor assembly further includes one or more brushes, and one or more apertures are defined in the motor housing and the sleeve, in alignment with the one or more brushes. In addition, a removable, soft sealant material is disposed within the one or more apertures, and a removable cap covers each aperture, to seal the interior of the motor housing from water when the housing is submerged.

In yet another feature of the invention, the apparatus further includes an umbilical that carries a power line and a gas conduit, for delivering electrical power and the pressurized shielding gas to the housing, which are configured to be received in releasable input connectors mounted on the housing. Similarly, the handheld welding torch assembly includes a power line and a gas conduit, which are configured to be received in releasable output connectors mounted on the housing.

Other features and advantages of the present invention should become apparent from the following description of the preferred embodiment, taken in conjunction with the accompanying drawings, which illustrate, by way of example, the principles of the invention.

DESCRIPTION OF THE PREFERRED EMBODIMENT

Figure 1:
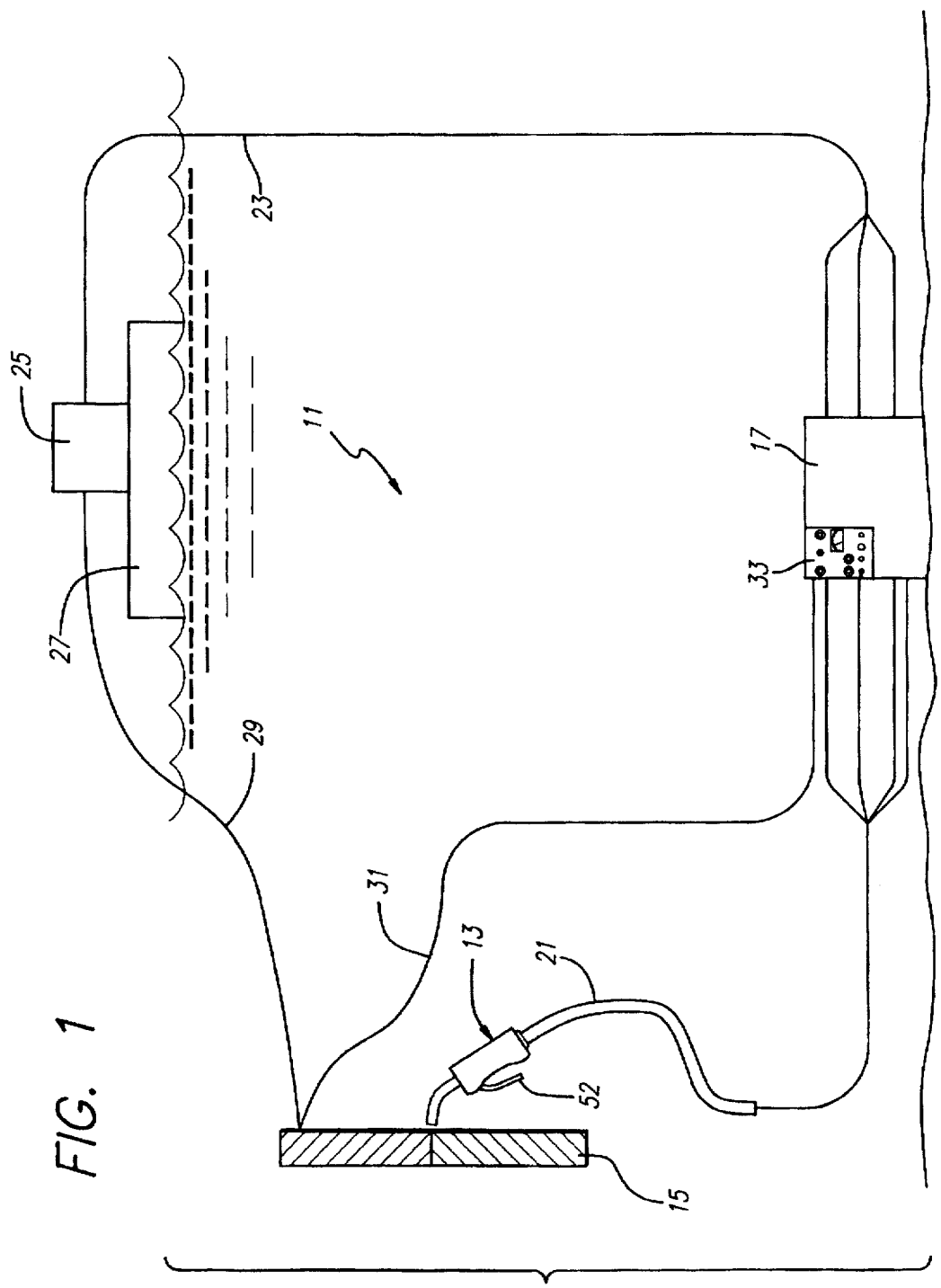
FIG. 1 is a schematic view of an underwater arcwelding apparatus embodying the invention, shown in its underwater operation, with electrical power and a pressurized shielding gas being delivered to the apparatus from a platform located above the water's surface.
Figure 2:
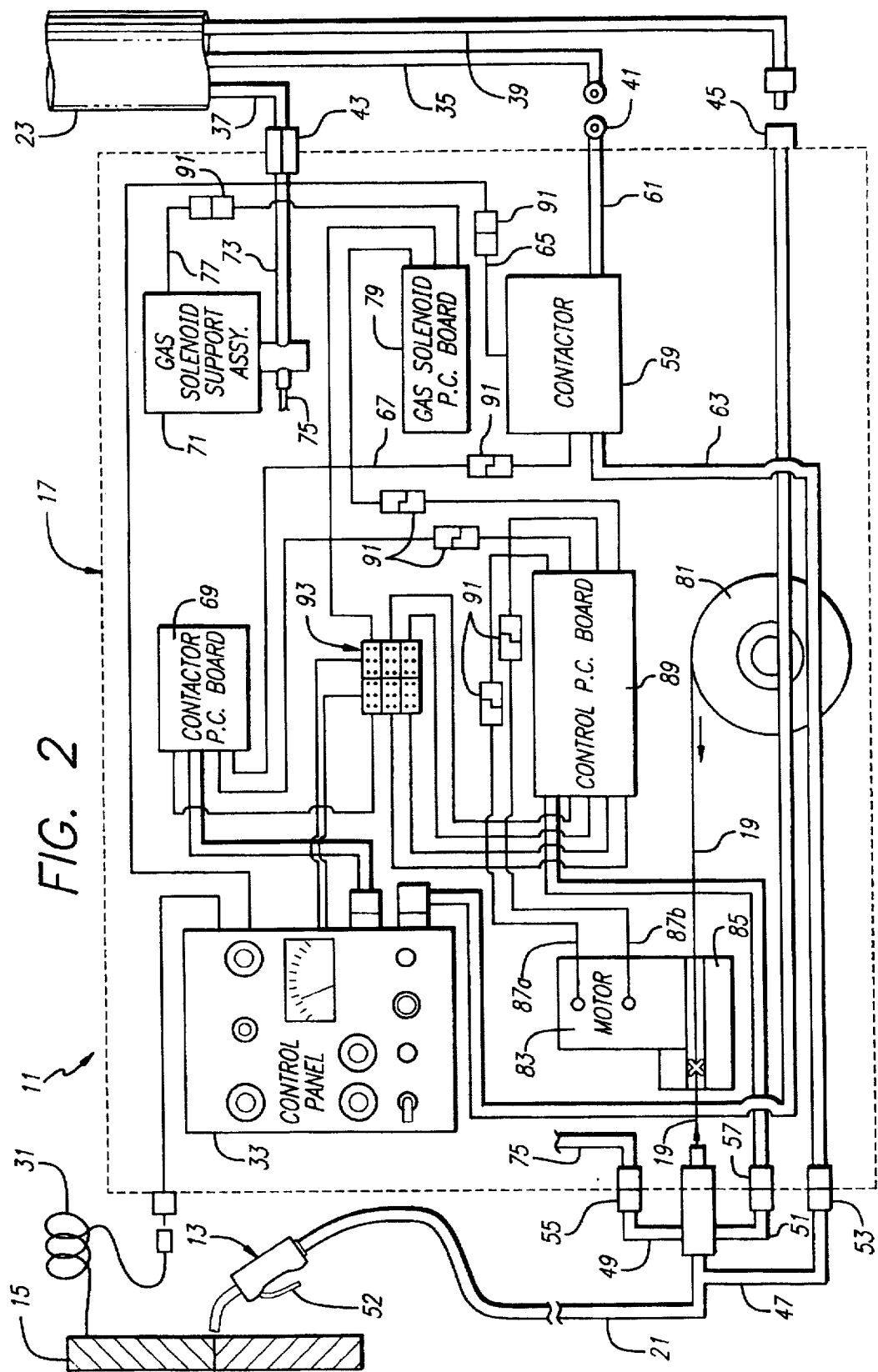
FIG. 2 is a simplified block diagram of the underwater arc-welding apparatus of FIG. 1.

With reference now to the drawings, and particularly to FIGS. 1 and 2, there is shown an underwater arc-welding apparatus 11 having a handheld torch assembly 13 for use in welding an underwater workpiece 15. The apparatus includes a housing 17 that houses various electrical components that provide electrical power, a pressurized shielding gas, and a consumable wire electrode 19 to the torch assembly, which are delivered by a cable assembly 21. The electrical power and the shielding gas are delivered to the housing via an umbilical 23 from appropriate sources 25 located on a platform 27 above the water. A primary ground line 29 directly connects the workpiece 15 with the electrical power source located on the above-water platform, and a reference ground line 31 connects the workpiece with the housing 17. A control panel 33 mounted externally on the front panel of the housing enables a diver/operator (not shown) to control numerous welding parameters, including the voltage level of the electrical power being delivered, the duration of the flow of the shielding gas, and the feed rate of the consumable wire electrode 19.

The umbilical 23, which connects the above-water platform 27 with the housing 17, carries a power line 35 that delivers electrical power and a gas conduit 37 that delivers the pressurized shielding gas. The umbilical further carries a control line 39 that delivers control signals in the opposite direction, i.e., from the housing 17 to the above-water platform 27, such control signals controlling the voltage level of the electrical power provided by the above-water power source 25. The power line 35, the gas conduit 37, and the control line 39 all interface with the housing via separate input connectors 41, 43 and 45, respectively, of conventional design, mounted on the housing's rear panel. The connector 41 for the power line 35 is a lug, while the connector 43 for the gas conduit 37 is threaded and the connector 45 for the control line is pluggable. These connectors facilitate a convenient connection and disconnection of the umbilical from the housing.

Similarly, the cable assembly 21, which connects the housing 17 with the handheld torch assembly 13, carries a power line 47 that delivers electrical power to the torch assembly and a gas conduit 49 that delivers the pressurized shielding gas to the torch assembly. The cable assembly further carries the consumable wire electrode 19 to the torch assembly, and it carries a control line 51 that delivers back to the housing a control signal indicating the status of a manually actuatable ON/OFF control lever 52 mounted on the torch assembly. The power line 47, the gas conduit 49, and the control line 51 are separated from each other immediately adjacent to the housing's front panel, and they interface with the housing via separate output connectors 53, 55 and 57, respectively, of conventional design. The connector 53 for the power line and the connector 57 for the control line 51 both are pluggable, while the connector 55 for the gas conduit 49 is threaded. These connectors facilitate a convenient connection and disconnection of the torch assembly and cable assembly. Separation of the power line, gas conduit, and control line simplifies the connector design.

The torch assembly 13 is configured to deliver electrical power and the consumable wire electrode 19 to the area to be welded, and to deliver the pressurized shielding gas coaxially around the electrode. Actuation of the ON/OFF lever 52 is detected by a suitable potted magnetic reed switch (not shown).

Located within the housing 17 are several modules and circuit boards that are separately and individually sealed and that are interconnected with each other by suitable underwater cables and connectors of conventional design. This configuration allows the housing, itself, to be non-watertight, i.e., to allow water to occupy the spaces between the apparatus' various modules and boards. This, in turn, allows the housing to have a relatively non-bulky configuration and thus to be readily transportable by the diver/operator. It also allows the housing to be opened while it is submerged, for servicing and/or replacement of its modules and boards.

The delivery of electric power through the housing 17 to the torch assembly 13 is controlled by a contactor 59, which receives electric power on line 61 from the input connector 41 and, when selectively closed, delivers that power on line 63 to the output connector 53. The contactor is controlled by control signals supplied on line 65 from the control panel 33 and on line 67 from a contactor printed circuit (PC) board 69. Not shown in the drawings, electrical power for powering the various components of the apparatus is derived from the power supplied on line 61 to the contactor.

The delivery of the pressurized shielding gas through the housing 17 is controlled by a gas solenoid assembly 71, which receives the pressurized shielding gas via a plastic tube 73 from the input connector 43 and, when selectively opened, delivers that gas via a plastic tube 75 to the output connector 55. The gas solenoid assembly is controlled by a control signal supplied on line 77 from a gas solenoid PC board 79.

The consumable wire electrode 19 is delivered to the torch assembly 13 from a spool 81 by an electric motor 83 and an associated gear box 85. Power for the motor and control of the motor's speed, and thus the wire electrode's delivery rate, is controlled via a power line 87 from a control PC board 89. Line 88 connects to a Hall effect sensor.

Numerous electrical connections are made between the control panel 33, the contactor PC board 69, the gas solenoid PC board 79, and the control PC board 89. These connections are made using conventional underwater cables. In many instances, pluggable underwater connectors 91 are used, to allow a convenient removal of selected modules, for servicing and/or replacement. In addition, a connector block 93 is provided for allowing a convenient organization of multiple connections using six separate multi-line cables. Each of the six multi-line cables delivers multiple lines to the connector block, where connections are made to the appropriate terminals of the block for delivery via another of the multi-line cables to another of the apparatus' modules or PC boards. This configuration effectively reduces the number of separate wires or cables interconnecting the various modules and PC boards.

Parameters that can be controlled by the diver/operator via the control panel 33 include the voltage level of the electrical power delivered through the contactor 59 to the torch assembly 13, the duration of the flow of the pressurized gas delivered through the gas solenoid assembly 71 (i.e., pre-flow and post-flow), and the delivery rate of the wire electrode 19 being driven through the gear assembly 85 by the electric motor 83. Other parameters that can be controlled include purging of the pressurized gas from the plastic tube 75 and the gas conduit 49 of the torch cable assembly 13, the advancement of the wire electrode without the application of welding power to the workpiece (referred to as "cold inching"), the polarity of the welding power being delivered, and the selection of a constant-current or a constant-voltage operating mode. All of these parameters are conventionally provided by welding apparatus of the kind normally used in non-underwater applications. An example of such a non-underwater welding apparatus is a model LN-25 welding machine sold by Lincoln Electric, of Cleveland, Ohio.

As mentioned above, the various modules and PC boards located within the housing 17 of the welding apparatus 11 all are sealed individually. Specifically, the contactor 59, the contactor PC board 69, the gas solenoid assembly 71, the gas solenoid PC board 79, the motor 83, control PC board 89, and the backside of the control panel 33 all are potted or encased in a suitable epoxy material, which is selected to withstand an underwater environment. In most cases, the cables that interconnect the various modules and PC boards simply emerge through the epoxy material, without the need for a built-in connector; rather, releasable connections are effected using the pluggable connectors 91 located in the cables, themselves, and using the connector block 93. Alternatively, pluggable connectors could advantageously be built into the individual modules and boards.

By sealing the separate modules and PC boards individually in this way, and by allowing water to enter the housing 17 to occupy the space between the modules and PC boards, several advantages are realized. First, the housing need not be constructed to withstand the pressures of underwater use and thus can be made of relatively thin sheet metal or plastic. Second, the housing can be opened while underwater, for servicing and/or replacement of one or more of its components, including for example the wire electrode spool 81. Finally, the presence of the water immediately adjacent to the apparatus' various components cools those components and reduces the risk of damage from overheating.

The gear assembly 85 that engages the consumable wire electrode 19 need not be sealed from the water. Similarly, the wire spool 81 from which the wire electrode is drawn need not be sealed from the water. In each case, the exposed components preferably are anodized or formed of a suitable plastic material. The spool preferably is sized to carry up to about 25 pounds of wire.

Figure 4:
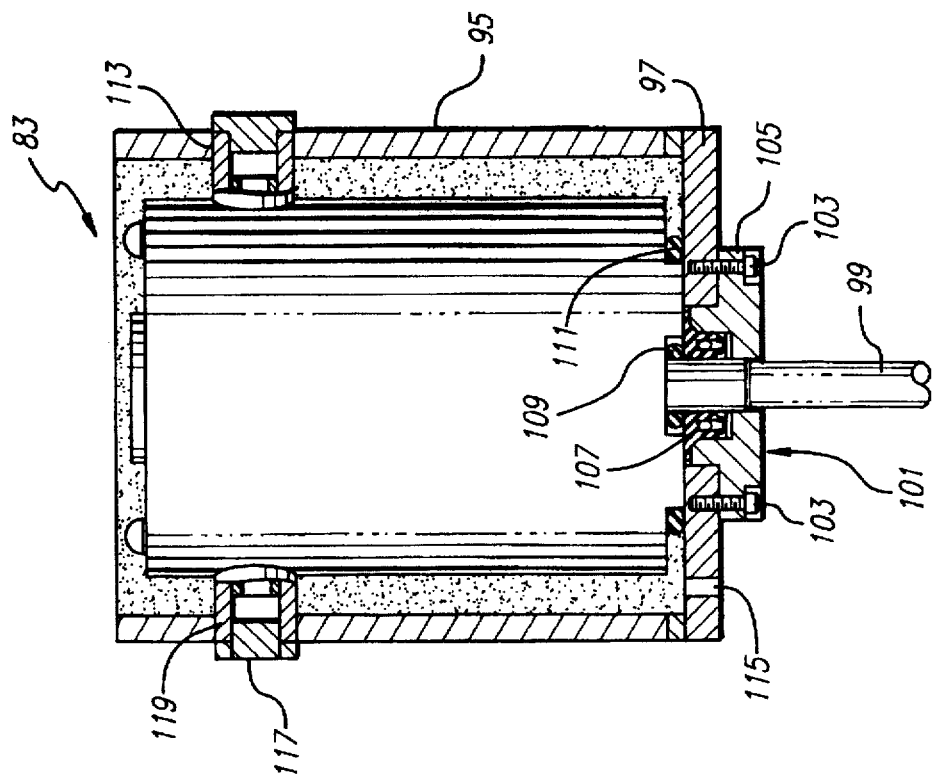
FIG. 4 is a cross-sectional view of the sealed electric motor of FIG. 3, including its end plate structure.
Figure 3:
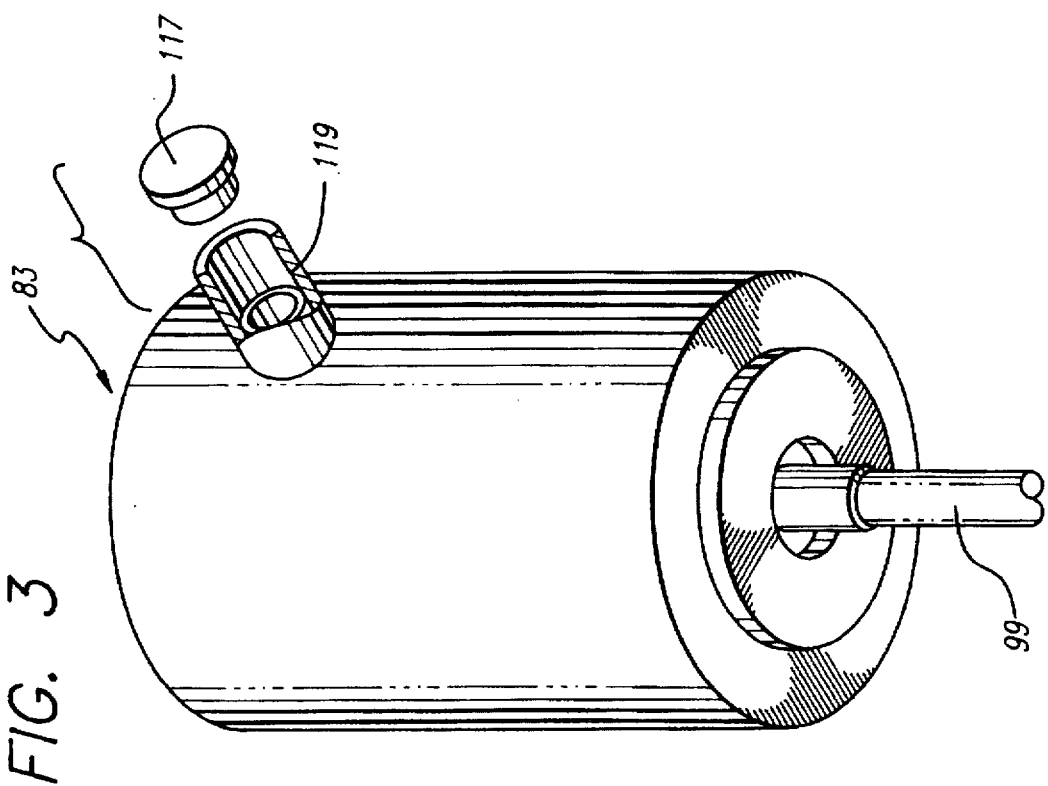
FIG. 3 is a perspective view of the sealed electric motor of the underwater arc-welding apparatus of FIGS. 1 and 2, for driving the gear assembly that delivers the consumable wire electrode to the handheld torch assembly.

Sealing of the electric motor 83 is described with reference to FIGS. 3 and 4. The motor is placed within a cylindrical sleeve 95 formed of polyvinyl chloride (PVC) or other suitable material, and an aluminum end plate 97 is placed over one end of the sleeve, with the motor shaft 99 projecting through a central aperture in the plate. A bushing 101 is centered over the shaft and secured in place using several screws 103 that project through an annular flange 105 of the bushing to engage threaded holes formed in the end plate. A shaft seal that includes a Bal seal 107 and an O-ring 109 is disposed between the shaft and the bushing, and caulking is disposed beneath the bushing's flange.

After the end plate 97 and the bushing 101 have been secured in place, a urethane potting material or other suitable material is injected into the space between the motor's housing and the end plate and cylindrical sleeve 95. A further O-ring 111 prevents the potting material from reaching the motor shaft 99. An inlet port 113 and an outlet port 115 facilitate the injection of the potting material. The potting material is exposed on the side of the motor 83 opposite the motor shaft.

To facilitate servicing of the motor's brushes (not shown), two special access holes and removable plugs 117 are provided in the cylindrical sleeve 95. The plugs preferably are insertable into short tubular extensions 119 projecting laterally from the sleeve, adjacent to the location of the brushes. A suitable soft potting material (not shown) can be placed within the tubular extensions, to provide the requisite sealing.

It thus will be appreciated that this construction effectively seals the motor 83 against the penetration of water when the apparatus 11 is submerged, yet it fully accommodates an unimpeded rotation of the motor shaft 99. Moreover, these advantages are achieved without the need for more traditional magnetic bearings or stuffing glands, which are substantially more expensive and which generally require a substantially bulkier motor construction.

As mentioned above, the backside of the control panel 33 is potted using a suitable epoxy material. The panel's front side, which carries several switches and control knobs and a display meter (FIG. 2), is sealed from the water using a special face plate. A plurality of sealed knob extensions are located in the face plate and arranged to engage the individual knobs on the underlying panel. Suitable knob extensions are available from Underwater Systems, of Stanton, Calif.

It should be appreciated from the above description that the present invention provides an improved arc-welding apparatus configured for use underwater. The apparatus includes a handheld torch that delivers electrical power, a shielding gas, and a consumable wire electrode to the site of the weldment. A housing houses all of the modules and PC boards of the kind usually incorporated into non-underwater welding apparatus, such that the diver/operator, himself, can control such welding parameters as the voltage level of the electrical power, the duration of the flow of the shielding gas, and the delivery rate of the electrode. In addition, sealing the apparatus' components from the water is accomplished by sealing the components individually, with electrical connections between the components being effected using underwater cables and connectors, and with the housing being configured to allow entry of water into the space between the components.

Although the invention has been described in detail with reference only to the presently preferred embodiment, those of ordinary skill in the art will appreciate that various modifications can be made without departing from the invention. Accordingly, the invention is defined only by the following claims.

We claim:

1. An underwater arc-welding apparatus, comprising:
   a handheld welding torch assembly that delivers electrical power and a consumable wire electrode to a workpiece, the torch assembly including a control switch that produces an ON/OFF signal;
   a wire delivery device that delivers the consumable wire electrode to the torch assembly;
   a first control circuit connected to the wire delivery device, for controlling the delivery rate of the consumable wire electrode, the first control circuit being responsive to the ON/OFF control signal and including a manually actuatable control device for selecting the desired wire delivery rate; and
   a non-watertight housing having an interior space in which are located the wire delivery device and at least a portion of the first control circuit;
   wherein the housing is configured to allow the entry of water into its interior space when the apparatus is submerged in water, and wherein the first control circuit and at least a portion of the wire delivery device are each sealed individually from water when the apparatus is submerged in water.

2. An underwater arc-welding apparatus as defined in claim 1, wherein:
   the wire delivery device includes
      a rotatable spool that carries the wire electrode,
      a gear assembly that draws the wire electrode from the rotatable spool, and
      an electric motor that drives the gear assembly at a controllably variable speed;
   the electric motor is sealed individually from water when the housing is submerged in water; and
   the rotatable spool and the gear assembly are not sealed from water when the housing is submerged in water.

3. An underwater arc-welding apparatus as defined in claim 2, wherein the wire delivery device further includes a Hall effect sensor for sensing the delivery rate of the wire electrode.

4. An underwater arc-welding apparatus as defined in claim 1, wherein the wire delivery device includes an electric motor assembly that is sealed individually from water when the apparatus is submerged in water, the motor assembly including:
   a generally cylindrical motor housing with a motor shaft projecting from one end of the motor housing;
   a sleeve that encircles the motor housing;
   an end plate secured to one end of the sleeve and having an aperture through which the motor shaft projects;
   a bushing disposed in the end plate aperture, encircling the motor shaft;
   a shaft seal located between the bushing and the motor shaft;
   a seal located between the bushing and the end plate; and
   a potting compound disposed in any space between the motor housing and the sleeve and end plate.

5. An underwater arc-welding apparatus as defined in claim 4, wherein the motor assembly further includes:
   one or more brushes;
   one or more apertures defined in the motor housing and the sleeve, in alignment with the one or more brushes; and
   a removable cap for each of the one or more apertures, to seal the interior of the motor housing from water when the housing is submerged in water.

6. An underwater arc-welding apparatus as defined in claim 4, rein the shaft seal includes an O-ring and a Bal seal connected in series with each other.

7. An underwater arc-welding apparatus as defined in claim 1, wherein:
   the handheld welding torch assembly includes a cable assembly that carries a power line for delivering the electrical power and a gas conduit for delivering the pressurized gas; and
   the apparatus further includes
      one or more releasable output connectors mounted on the housing and configured to receive the power line and the gas conduit of the handheld welding torch assembly,
      an umbilical that carries a power line for delivering electrical power and a gas conduit for delivering the pressurized gas to the housing, and
      one or more releasable input connectors mounted on the housing and configured to receive the power line and the gas conduit of the umbilical.

8. An underwater arc-welding apparatus, comprising:
   a handheld welding torch assembly that delivers electrical power, a pressurized gas, and a consumable wire electrode to a workpiece, the torch assembly including a control switch that produces an ON/OFF signal;
   a contactor that receives electrical power and delivers such electrical power to the torch assembly;
   a gas solenoid that receives a pressurized gas and delivers such pressurized gas to the torch assembly;
   a wire deliver device that delivers the consumable wire electrode to the torch assembly;
   a first control circuit connected to the wire delivery device, for controlling the delivery rate of the consumable wire electrode, the first control circuit being responsive to the ON/OFF control signal and including a manually actuatable control device for selecting the desired wire delivery rate; and
   a second control circuit connected to the contactor and configured to control the delivery of electrical power through the contactor to the torch assembly;
   a third control circuit connected to the gas solenoid and configured to control the duration of the flow of pressurized gas through the gas solenoid to the torch assembly; and
   a non-watertight housing having an interior space in which are located the wire delivery device and at least a portion of the first control circuit;
   wherein the torch assembly delivers the electrical power, the pressurized gas, and the consumable wire electrode to the workpiece to be welded;
   wherein the housing is configured to allow the entry of water into its interior space when the apparatus is submerged in water;
   and wherein the contactor, the gas solenoid, the first control circuit, the second control circuit, the third control circuit, and at least a portion of the wire delivery device are each housed within the housing and are each sealed individually from water when the housing is submerged in water.

9. An underwater arc-welding apparatus as defined in claim 8, wherein the first, second, and third control circuits together include a control panel located on or in the housing and configured to permit a diver/operator to controllably adjust the voltage level of the electrical power delivered to the torch assembly, the duration of the flow of pressurized gas to the torch assembly, and the delivery rate of the wire electrode.

10. An underwater arc-welding apparatus as defined in claim 8, wherein the contactor, the gas solenoid, and the first, second, and third control circuits are sealed individually in a potting material.

11. Underwater arc-welding apparatus as defined in claim 8, wherein the contactor, the gas solenoid, and the first, second, and third control circuits are electrically connected to each other by underwater cables and underwater connectors.

12. An underwater arc-welding apparatus as defined in claim 8, wherein the second control circuit and the third control circuit are each responsive to the ON/OFF control signal produced by the control switch of the torch assembly.

13. A hermetically sealed electric motor assembly, comprising:

a cylindrical motor housing with a motor shaft projecting from one end of the motor housing;

a sleeve that encircles the motor housing;

an end plate secured to one end of the sleeve and having an aperture through which the motor shaft projects;

a bushing disposed in the end plate aperture, encircling the motor shaft;

a shaft seal located between the bushing and the motor shaft;

a seal located between the bushing and the end plate; and one or more brushes;

one or more apertures defined in the motor housing and the sleeve, in alignment with the one or more brushes;

a removable cap for each of the one or more apertures, to seal the interior of the motor housing from water; and a potting compound disposed in any space between the motor housing and the sleeve and end plate.

14. A hermetically sealed electric motor assembly as defined in claim 13, wherein the potting compound defines the end of the motor assembly opposite the motor shaft.

15. A hermetically sealed electric motor assembly as defined in claim 13, and further including a removable, soft sealant material disposed within the one or more apertures, beneath the associated removable cap.

* * * * *